(12) United States Patent
Zhang

(10) Patent No.: US 7,483,624 B2
(45) Date of Patent: Jan. 27, 2009

(54) SYSTEM AND METHOD FOR INDEXING A VIDEO SEQUENCE

(75) Inventor: Tong Zhang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1243 days.

(21) Appl. No.: 10/231,036

(22) Filed: Aug. 30, 2002

(65) Prior Publication Data

US 2004/0041831 A1 Mar. 4, 2004

(51) Int. Cl.
*H04N 5/76* (2006.01)
*H04N 7/00* (2006.01)
*H04N 5/00* (2006.01)

(52) U.S. Cl. .......................... 386/96; 386/117

(58) Field of Classification Search .................. 386/1, 386/46, 96, 87, 111, 95; 348/231.99, 231.3–231.4
See application file for complete search history.

(56) References Cited

U.S. PATENT DOCUMENTS

| | | | | |
|---|---|---|---|---|
| 5,485,611 | A * | 1/1996 | Astle | 707/1 |
| 5,635,982 | A * | 6/1997 | Zhang et al. | 348/231.99 |
| 5,835,667 | A * | 11/1998 | Wactlar et al. | 386/96 |
| 6,389,168 | B2 * | 5/2002 | Altunbasak et al. | 382/224 |
| 6,748,158 | B1 * | 6/2004 | Jasinschi et al. | 386/69 |
| 6,973,256 | B1 * | 12/2005 | Dagtas | 386/46 |

FOREIGN PATENT DOCUMENTS

| | | |
|---|---|---|
| JP | 10084526 A | 3/1998 |
| JP | 2000175149 A | 6/2000 |
| WO | WO02/07164 | 1/2002 |
| WO | WO02/21843 | 3/2002 |

OTHER PUBLICATIONS

Hong Jiang Zhong, et al, "Developing Power Tools for Video Indexing and Retrieval," 2185 SPIE 140-149 (Aug. 1994).*
Hongjiang Zhang et al: "Automatic Partitioning of Full-Motion Video" Multimedia Systems, Springer Verlag, DE, vol. 1, No. 1, 1993, pp. 10-28 XP000572496.
Li W et al: "Vision: A Digital Video Library" Proceedings of the ACM International Conference on Digital Libraries, XX, XX, Mar. 20, 1996, pp. 19-27, XP002910575.
Gulrukh Ahanger, et al., "A Survey of Technologies for Parsing and Indexing Digital Video," Journal of Visual Communication and Image Representation, Mar. 1996, at 28-43.

(Continued)

*Primary Examiner*—Thai Tran
*Assistant Examiner*—Gelek Topgyal

(57) ABSTRACT

A method and system for indexing a video sequence comprised of video information and audio information, wherein the video sequence has been created by at least one camera. The video sequence is separated into motion segments that were created while the camera was in motion and into still segments that were created while the camera was in a fixed position based on changes in the camera motion mode. Each still segment is partitioned into episodes based on changes in the audio information in each still segment, and the video sequence is indexed with an identifier that signifies at least a start or an end of an episode contained in the video sequence.

19 Claims, 2 Drawing Sheets

OTHER PUBLICATIONS

Kenichi Minami, et al., "Video Handling with Music and Speech Detection," IEEE Multimedia, Jul.-Sep. 1998, at 17-25.

TongZhang and C.-C. Jay Kuo, Content-Based Audio Classification and Retrieval for Audiovisual Data Parsing, 69-81 (Kluwer Academic Publishers 2001).

Hong Jiang Zhang, et al., "Developing Power Tools for Video Indexing and Retrieval," 2185 SPIE 140-149 (Aug. 1994).

HongJiang Zhang, et al., "Automatic Partitioning of Full-Motion Video," Institute of Systems Science, National University of Singapore, 10-28 (1993).

JP Office Action for counterpart Patent Application No. 2004-531568 with Dispatch Date Jul. 11, 2008.

* cited by examiner

SYSTEM AND METHOD FOR INDEXING A VIDEO SEQUENCE

BACKGROUND OF THE INVENTION

1. Field of the Invention

The present invention relates to indexing video sequences and, more specifically, to systems and methods for indexing audio/video sequences into episodes and highlights.

2. Background Information

With motion pictures and home movies, there is a desire to break long sequences of video into segments to, for example, catalogue their content and index their location on the video sequence. This cataloging and indexing allows specific scenes and events within the video sequence to be quickly located. The issue of long sequences of video arises more frequently in home videos than in professionally-produced videos because the latter are often created in smaller, edited sequences.

Video sequences can be segmented into shorter video segments, known as "shots." The start and end of video shots are delineated by camera breaks, which are the turning on and the turning off of the camera. That is, the turning on of the camera signifies the start of a shot, and the turning off of the camera signifies the end of a shot. These issues are discussed in more depth in Gulrukh Ahanger, et al., "A Survey of Technologies for Parsing and Indexing Digital Video," Journal of Visual Communication and Image Representation, March 1996, at 28-43, the contents of which are incorporated herein by reference. Various methods for audio-based classification of a video sequence are disclosed in Kenichi Minami, et al., "Video Handling with Music and Speech Detection," IEEE Multimedia, July-September 1998, at 17-25 and Tong Zhang and C.-C. Jay Kuo, Content-Based Audio Classification and Retrieval for Audiovisual Data Parsing, 69-81 (Kluwer Academic Publishers 2001), the contents of which are incorporated herein by reference.

One technique by which the camera breaks within a video sequence can be detected for dividing the video sequence into shots is through the use of video frame histograms. Each frame making up a video sequence can be reduced to a pixel-level histogram. That is, each pixel in the frame is added to a particular column of the histogram based on the color of the pixel as matched against a color pallet where each color is associated with a number in a range from 0 to 255. The respective histograms for successive pairs of frames in the sequence are compared, and if the difference between two successive histograms exceeds a particular maximum, a scene or event change is presumed to have occurred, and a new shot is denoted. This technique is discussed in more detail in HongJiang Zhang, et al., "Developing Power Tools for Video Indexing and Retrieval," 2185 SPIE 140-149 (8/94) and HongJiang Zhang, et al., "Automatic Partitioning of Full-Motion Video," Institute of Systems Science, National University of Singapore, 10-28 (1993), the contents of which are incorporated herein by reference.

Shots defined using existing techniques tend to be very long, especially when these techniques are applied to home videos. Home videos are frequently taken of a single event, such as children playing in the back yard or a wedding. In such videos, the camera can be left running for an extended period of time (for example, to record a child playing or a sports event). In addition, the background is often the same, such that histograms of successive frames are often similar. Therefore, long sequences of video are retained and viewed in their entirety to locate a desired scene or event.

SUMMARY OF THE INVENTION

Exemplary embodiments are directed to a method and system for indexing a video sequence comprised of video information and audio information, wherein the video sequence has been created by at least one camera, by separating the video sequence into motion segments that were created while the camera was in motion and into still segments that were created while the camera was in a fixed position; partitioning each still segment into episodes based on changes in the audio information in each said still segment; and indexing the video sequence with an identifier that signifies at least one of a start or an end of an episode contained in the video sequence.

Alternative embodiments provide a computer-based system for indexing a video sequence comprised of video information and audio information, wherein the computer-based system includes a video camera configured to record a video sequence; and a processor adapted to detect changes in camera motion associated with the video sequence and to separate the video sequence into motion segments and still segments; detect, within each separated still segment, a change in audio information and to partition the separated still segments into episodes based on a detected change in the audio information; and mark at least the start or the end of a partitioned episode in the video sequence.

An additional embodiment is also directed to a computer readable medium encoded with software for indexing a video sequence comprised of video information and audio information, wherein the video sequence has been created by at least one camera, by separating the video sequence into motion segments that were created while the camera was in motion and into still segments that were created while the camera was in a fixed position; partitioning each still segment into episodes based on changes in the audio information in each said still segment; and indexing the video sequence with an identifier that signifies at least one of a start or an end of an episode contained in the video sequence.

BRIEF DESCRIPTION OF THE DRAWINGS

These and other objects and advantages of the present invention will become more apparent and more readily appreciated to those skilled in the art upon reading the following description of the preferred embodiments, taken in conjunction with the accompanying drawings, wherein.

DETAILED DESCRIPTION OF THE PREFERRED EMBODIMENTS

Figure 1:
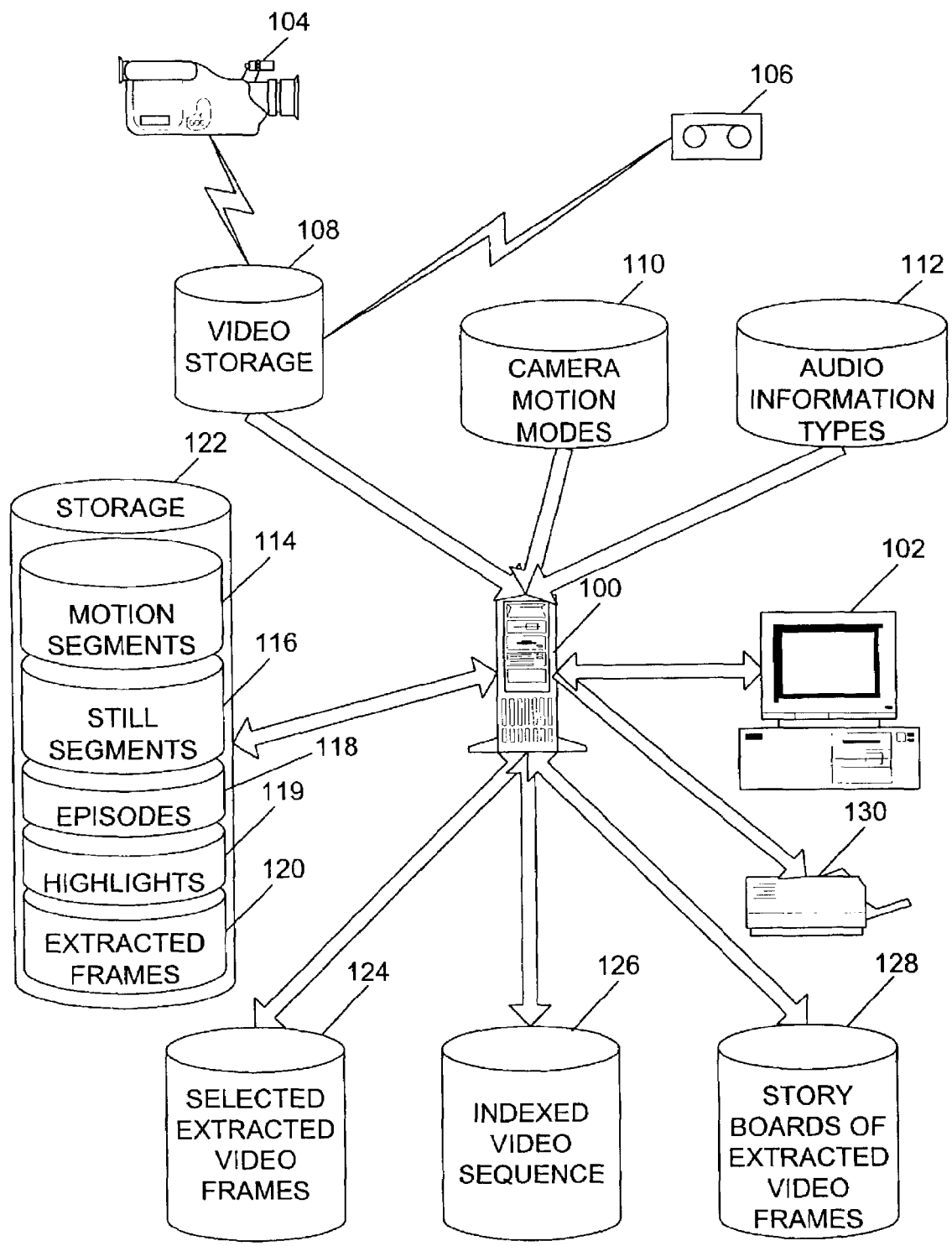
FIG. 1 shows a component diagram of a system for indexing a video sequence in accordance with an exemplary embodiment of the invention.

FIG. 1 illustrates a computer-based system for indexing a video sequence according to an exemplary embodiment of the invention. In particular, FIG. 1 shows a video camera 104 configured to record a video sequence. The video camera 104 can be any analog or and/or digital device capable of capturing and recording images and associated audio information. The recorded video sequence can optionally be recorded onto a separate storage medium, such as a tape 106 and/or stored on a video storage device 108.

The video sequence is input to a processor in a computer 100 according to exemplary embodiments. The processor in the computer 100 can be a single processor or can be multiple processors, such as first, second, and third processors, each processor adapted by software or instructions of exemplary embodiments to detect changes in camera motion associated with the video sequence and to separate the video sequence into motion segments and still segments; to detect, within each separated still segment, a change in audio information and to partition the separated still segments into episodes based on a detected change in the audio information; and/or to mark at least the start or the end of a partitioned episode in the video sequence. The multiple processors can be integrated within the computer 100 or can be configured in separate computers which are not shown in FIG. 1. The computer 100 can include a computer-readable medium encoded with software or instructions for controlling and directing processing on the computer 100 for indexing a video sequence into episodes.

The computer 100 can include a display, graphical user interface, personal computer 102 or the like for controlling the processing and/or viewing the results of the indexing of the video sequence. A video sequence is input to the computer 100 from a live representation of an event as captured by one or more cameras 104 and/or from a prior recording of an event stored on a medium such as the tape 106. While FIG. 1 shows the video sequences from the camera 104 and the tape 106 being stored on a video storage medium 108 prior to being input to the computer 100 for processing, the video information can also be input to the computer 100 directly from the camera 104 and/or the video tape 106 without detracting from the features of exemplary embodiments. Embodiments can be implemented within the camera 104 itself so that the video sequence can be indexed concurrently with, or shortly after, the event being recorded by the camera 104.

The computer 100 accepts as parameters one or more camera motion modes and audio information types with which to index the video sequence being input from the video storage 108. While the camera motion modes and audio information types are shown as residing on storage devices 110 and 112, respectively, this control information can also reside in memory in the computer 100 or in alternate storage media without detracting from the features of exemplary embodiments. As will be explained in more detail regarding the processing steps shown in FIG. 2, exemplary embodiments utilize the camera motion modes and the audio information types to parse the incoming video sequence into motion segments 114, still segments 116, episodes 118, highlights 119, and extracted video frames 120, all of which can be stored on one or more storage devices 122. The processor operating under control of exemplary embodiments further outputs extracted video frames 124, the indexed video sequence 126, and one or more story boards of extracted video frames 128, all of which can be stored on one or more storage devices as shown in FIG. 1. Additionally, the results of the indexing process and printed images of all or portions of the processed video sequence can be output to a printer 130.

Figure 2:
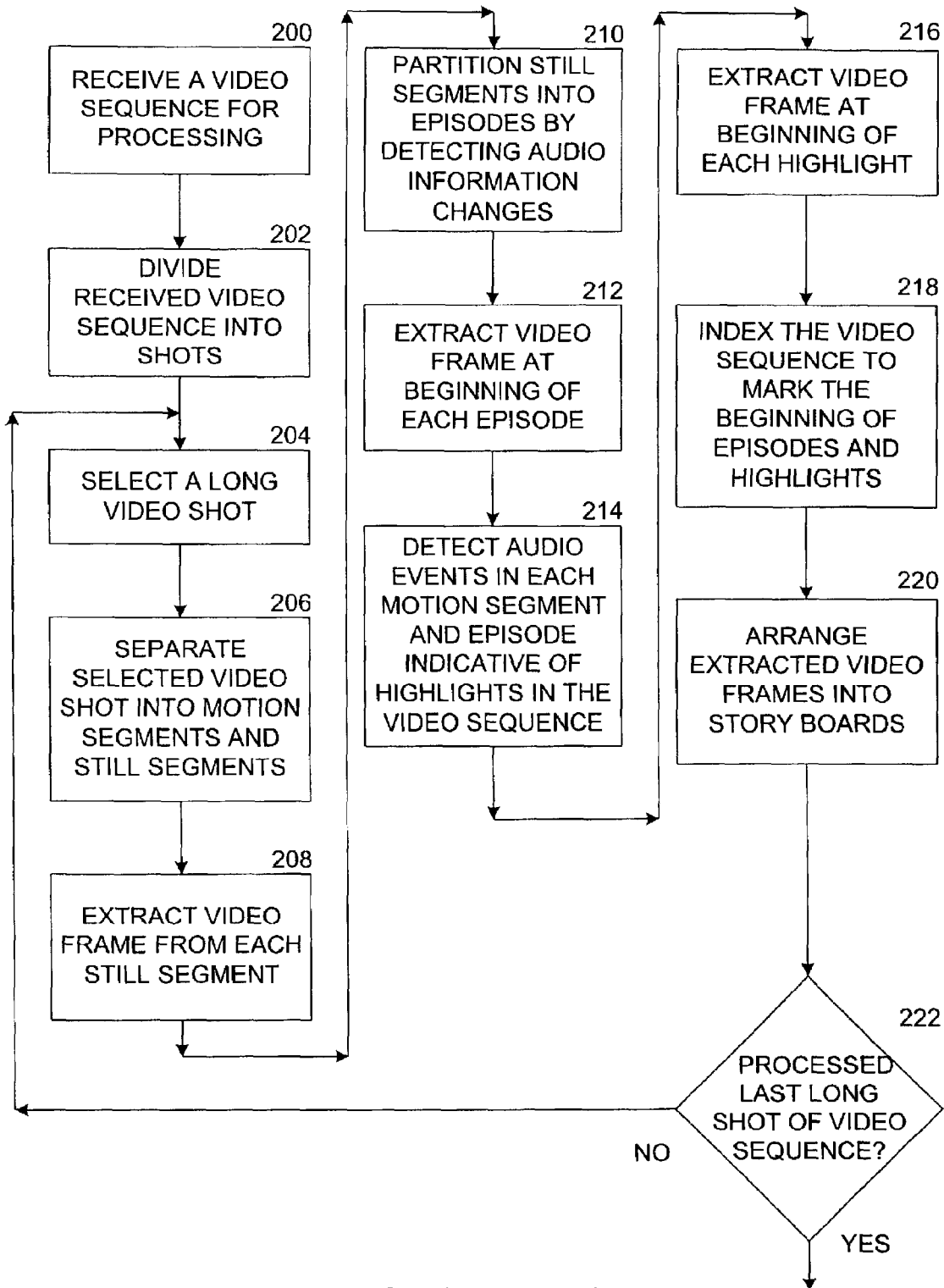
FIG. 2 shows a block flow chart of an exemplary method for indexing a video sequence.

Referring now to FIGS. 1 and 2, a description of an exemplary embodiment of a system for indexing a video sequence will be presented. FIG. 2 shows a method for indexing a video sequence comprised of video information and audio information, beginning with the reception of a video sequence from the video storage 108, the video tape 106, and/or the camera 104 at step 200 for processing by the computer 100. The video sequence information recorded by the camera 104 and stored on the tape 106 and the video storage 108 can be comprised of both video information and audio information. At step 202 the received video sequence is divided into shots according to one or more known techniques for segmenting the video sequence according to camera breaks, or camera on/off events. The detection of camera transitions, such as fade in, fade out, and dissolving can also be considered indicative of camera breaks in addition to the express turning off and on of the camera.

While exemplary embodiments can process all of the shots that comprise a video sequence for purposes of indexing the entire video sequence, a user is typically more interested in indexing the longer shots since the longer shots are more likely to contain images and sounds of multiple events than are shorter shots. The length of a shot to be indexed by exemplary embodiments is selectable by the user through the interface 102 and can be set, for example, as a function of time, such as a minimum of two minutes, or any other specified time frame. In this manner, the user can customize the processing of the indexing system to match the content of the video sequence. For example, if the video content is a relatively high action event such as a basketball game, the length of the shot can be set at a shorter interval, such as thirty seconds. If the recorded event is a low action event, such as a band concert, the long shot can be set for a longer period, such as three minutes. The system then selects the next available qualifying long shot in the video sequence, such as a shot exceeding a minimum of three minutes, or any other specified time frame.

The selected long shot of the video sequence is then separated into motion segments and still segments at step 206. A motion segment represents a video sequence created, or recorded, by a camera 104 that is in one mode of motion, such as in the operation of panning (left or right), tilting (up or down), or zooming (in or out). A still segment is a video sequence segment created while the camera 104 was still, such as when the camera 104 was fixed on a particular scene or was locked onto a tripod without being swivelled. Alternatively, the system permits a minimal amount of movement in the camera 104 to also qualify as a still state to accommodate vibration, shaking, and bumping of the camera 104. The system separates the selected video shot into segments by detecting a change in camera motion within the video information of the shot, based on the camera motion mode information stored on the storage device 110. Using known techniques for detecting camera motion, such as by comparing frame histograms or motion vectors, the system can determine when the camera motion mode within the video shot changes from one motion mode to another, thereby denoting the end and/or the beginning of a motion segment and/or a still segment.

In an alternative embodiment, selected "slow" motion can be detected and utilized to partition the video shot into segments for indexing. A slow camera motion, such as a slow panning from left to right, can indicate the camera operator is recording a scene or object of interest and, accordingly, creating a video shot segment of future interest to be indexed. In this embodiment, a relative or actual speed of various camera motions can be selected as parameters via the interface 102. When the system detects within the video shot that the speed of the camera motion has slowed to a selected "slow" speed for that camera motion, the system will treat the video shot at that position in the same manner as the beginning of a still segment and will flag the segment in the same manner as discussed above when the system has detected a change from a motion segment to a still segment. In this manner, slow motion segments can be separated from fast motion segments.

Various camera motion modes can be selected as parameters from the storage device 110 via the interface 102 for controlling the segment separation. Exemplary camera motion modes include, but are not limited to panning left, panning right, tilting up, tilting down, zooming in, and zooming out. The system can also detect when the camera motion changes from a motion mode to a still, or fixed, position and from a still position to a motion mode. The processing of exemplary embodiments on the video sequence segment can be controlled to detect particular subsets of the camera motion modes, such as, for example, detecting only panning left and right as indicative of a change in camera motion. In such an application of the system, each time a change in camera motion is detected as denoting changing from panning left to panning right, the system marks the end of one motion segment and the beginning of another motion segment. If the change in camera motion is detected as being from a state of panning left to a state of still, the system flags the end of a motion segment and the beginning of a still segment. The separated motion segments and still segments are optionally stored in storage devices 114 and 116, respectively.

From each still segment produced in step 206, a video frame is extracted in step 208 to identify the content of the segment and is retained in storage 120. The particular video frame to be extracted as representative of the separated still segment can be selected through the election of parameters by the user via the interface 102 as being the first frame of the still segment, the middle frame of the still segment, or a frame representative of the scene of the still segment. Each video frame extracted by exemplary embodiments has reference information, such as a time stamp, retained that enables the extracted video frame to be linked, or indexed, back to the location in the video stream from which the extracted frame originated. The linking can be accomplished by a temporal or chronological reference or can include a frame number mapping to the video sequence or the like. In this manner, the location of the beginning of the separated still segment is marked in the video sequence for later play back by a user. The reference information can be retained in storage 120 with the extracted video frame or can be stored in a separate storage file or data base without detracting from the inventive features of the system.

In step 210, each still segment is partitioned into smaller segments, called episodes, by detecting changes in the audio information within each still segment. For example, applause and acclaim sounds, as well as the start and stop of music and speech in a performance or reunion video can be used to partition the video segment into individual episodes. A discussion regarding how content changes can be detected in an audio signal can be found in the article by HongJiang Zhang et al., entitled "Developing Power Tools for Video Indexing and Parsing." In step 210, the system draws from various audio information types as retained in storage 112 and as optionally selected as parameters through the interface 102 and marks a new episode whenever an audio information change is detected within the still segment. Examples of audio information types include music, speech, and environmental (such as whistling, the sound of a whistle, applause, and acclaim) sounds. At the beginning of each still segment, the type and the volume of the audio information found at the beginning of the segment is determined and recorded. For example, the still segment can begin with music being played at a relative sound level of 5. Should the system detect a sound level increase or decrease by a relative level or by a selected percentage within the still segment, the system will denote that an episode change has occurred in the video segment and will partition the still segment by marking the end of the previous episode and the beginning of a new episode. Correspondingly, if the audio information in the segment changes audio information type, such as from music to speech, from speech to applause, or from music to silence, the system will correspondingly denote the end and the beginning of an episode. If, for example, "silence" has not been selected as an audio information type for denoting a change in episodes, the system will not recognize the occurrence of silence on the still video segment as denoting a change in episodes.

Since audio information can be simultaneously comprised of multiple audio information types, the system permits the mixing of audio types in the partitioning process. If, for example, the audio information on the video segment is a combination of instrumental music, singing, and applause, if any of these three types of audio information ceases, the system can be instructed to denote this change in audio information as the end of an episode and the beginning of a new episode. Correspondingly, detecting an additional audio type to an existing audio stream can be utilized to denote the end and beginning of episodes. Upon detecting a new episode, the system extracts at step 212 a video frame at the beginning of the new episode and stores it in storage 120. Entire episode sequences, from beginning to end, are optionally stored in storage 118.

In an alternative embodiment, highlights in the video sequence can be detected at step 214 and indexed for subsequent location and playback. In this manner, for example, a key basket in a basketball game can be indexed for ease of locating and playing from a video sequence. In this embodiment, the system can be instructed to process the still segments, the motion segments, and/or the episode segments of the video stream. While processing the audio information of a segment, such as discussed above regarding step 210, the system can be instructed to detect certain audio information types that can be representative of a highlight within the video sequence. This instruction or control can be effected by a user utilizing the interface 102 to select particular audio information types from storage 112 that are to be used by the processor 100 to detect the occurrence of highlights on the video sequence. Examples of highlight audio information types include applause, acclaim, whistles and whistling, screaming, and heightened audio levels.

Upon detection of a selected highlight audio information type in the video segment, the system denotes the beginning of the highlight event in the video segment. When the detected highlight audio information has ceased or has diminished by a predetermined volume level or percentage level, the system denotes the end of the highlight event in the video segment. Because an event or highlight can begin on a video sequence before any corresponding highlight audio information is detected, the system has the option of advancing the beginning of the highlight to be several seconds or even minutes before the detection of the highlight audio information on the video sequence. In this manner, the entire highlight sequence can be marked and subsequently located and viewed. At step 216, the system extracts a video frame at the beginning of the highlight segment and stores the video frame in storage 120. The highlight segment, from beginning to end, is optionally stored in storage device 119.

The video sequence is indexed at step 218 with an identifier to mark the beginning and end of each episode and highlight detected on the video sequence by the system. Alternatively, the indexing of the video sequence for episodes can occur as part of step 210, and the indexing of the video sequence for highlights can occur as part of step 214. The indexed video sequence is optionally stored on device 126. In an exemplary embodiment, the video sequence is indexed through the mapping of pointers linked to each extracted video frame. In this embodiment, each extracted video frame representing the beginning of an episode or the beginning of a highlight has a pointer associated with the frame that links back to the video frame's temporal position in the video sequence. The pointer can comprise a time stamp that indicates the chronological position of the extracted video frame in the video sequence. By clicking on a video frame displayed as part of a story board, the system will link to the corresponding segment within the video sequence and play back the selected episode or highlight for viewing by a user.

At step 220, the video frames that have been extracted in steps 208, 212, and 216 can be arranged into story boards to not only provide an abbreviated summary video snapshot of the video sequence shot but also as an indexing tool with which to access and view desired portions of the video sequence. One such story board can be a chronological, or temporal, video sequence comprised of each video frame extracted by the system in steps 208, 212, and 216 based on their individual time stamps to represent the video sequence. A story board of dissimilar extracted video frames can be built to form a higher level representation of the video sequence. This higher level story board can be utilized to view a summary of the content of the video sequence. Story boards can also be built that are comprised of only episodes and/or only highlights. Each of the story boards created by exemplary embodiments can be stored in a storage device or medium 128 for subsequent processing and/or access. A user can view each story board in the form of a slowly streaming video sequence or as a display of individual frames. The user can select, or click on, any displayed frame of the story board, and the system will locate the corresponding video stream beginning with the selected video frame and play the stream back to the user. Playback of the video stream can be from the original input video sequence, from the indexed video sequence stored on storage device 126, from the episode sequences stored on device 118, and/or from the highlight sequences stored on device 119.

Playback of the selected episode or highlight can be by one of several techniques. For example, playback of an episode or highlight can be limited to a selected episode or highlight, whereupon playback will stop at the last frame of the selected episode or highlight. Alternatively, playback can be repetitive, with the selected episode or highlight being played repeatedly. Additionally, playback can be selected to be continuous, where playback continues beyond the end of the selected episode or highlight to the remaining portion of the video sequence until stopped by the viewer or until the end of the sequence is reached.

At step 222, the system checks to determine whether the last long shot of the video sequence has been processed into segments and further into episodes. If additional long shots of the original video sequence remain to be processed, the system selects at step 204 the next long video shot in the video sequence and commences parsing the shot as discussed above commencing with step 206.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A method for indexing a video sequence comprised of video information and audio information, wherein the video sequence has been created by at least one camera, comprising:
    separating the video sequence into motion segments that were created while the camera was in motion and into still segments that were created while the camera was in a fixed position wherein separating the video sequence further comprises detecting a change in camera motion in the video information, and marking the location in the video stream where the change in camera motion is detected;
    partitioning each still segment into episodes based on changes in the audio information in each said still segment;
    indexing the video sequence with an identifier that marks at least one of a start or an end of an episode contained in the video sequence,
    wherein a change in audio information includes an end of one type of audio information and a beginning of another type of audio information;
    separating the motion segments into fast motion segments and slow motion segments based on the speed of the camera motion;
    partitioning each slow motion segment into episodes based on changes in the audio information in each said slow motion segment.

2. The method according to claim 1, wherein the video sequence includes a representation of at least one of a live event or a recorded event.

3. The method according to claim 1, wherein the change in camera motion includes a change from one of a plurality of camera motion modes to another one of a plurality of camera motion modes.

4. The method according to claim 3, wherein the plurality of camera motion modes include panning left, panning right, tilting up, tilting down, zooming in, zooming out, and fixed.

5. The method according to claim 1, wherein the types of audio information include two or more of music, singing, speech, applause, acclaim, screaming, whistle, whistling, and silence.

6. The method according to claim 1, including detecting one or more events in the audio information of the motion segments and in the audio information of the partitioned episodes, wherein each detected event indicates a highlight in the video sequence.

7. The method according to claim 6, including extracting a video frame from the video sequence at the beginning of each partitioned episode and at the beginning of each detected highlight.

8. The method according to claim 6, wherein the indexing comprises:
    selecting a video frame at the beginning of each of the separated motion segments, the partitioned episodes, and the detected highlights within the video sequence;
    mapping a pointer to the location in the video sequence corresponding to each selected video frame; and building a story board of the selected video frames.

9. The method according to claim 8, wherein the story board is built by arranging the selected video frames in temporal order.

10. The method according to claim 8, wherein the story board is built by arranging dissimilar extracted video frames to form a higher level representation of the video sequence.

11. The method according to claim 8, wherein each pointer is mapped to the selected video frame according to a time stamp associated with the selected video frame.

12. The method according to claim 8, comprising:
    viewing the built story board;
    selecting a video frame from the built story board; and
    playing the indexed video sequence segment corresponding to the pointer mapped to the selected story board frame.

13. The method according to claim 1, wherein the change in audio information also includes a change in a sound level of the audio information by a predetermined relative level or by a predetermined selected percentage.

14. A computer-based system for indexing a video sequence comprised of video information and audio information, comprising:
   a video camera configured to record a video sequence; and
   a processor adapted to:
      detect changes in camera motion associated with the video sequence and to separate the video sequence into motion segments that were created while the camera was in motion and into still segments that were created while the camera was in a fixed position;
      detect, within each separated still segment, a change in audio information and to partition the separated still segments into episodes based on a detected change in the audio information;
      mark at least the start or the, end of a partitioned episode in the video sequence;
      separating the motion segments into fast motion segments and slow motion segments based on the speed of the camera motion; and
      partitioning each slow motion segment into episodes based on changes in the audio information in each said slow motion segment.

15. The computer-based system of claim 14, wherein the processor comprises two or more processors.

16. The computer-based system of claim 14, wherein the change in audio information also includes a change in a sound level of the audio information by a predetermined relative level or by a predetermined selected percentage.

17. A computer readable medium encoded with software for indexing a video sequence comprised of video information and audio information, wherein the video sequence has been created by at least one camera, by the software being encoded for causing a computer to execute the steps of:
   separating the video sequence into motion segments that were created while the camera was in motion and into still segments that were created while the camera was in a fixed position;
   partitioning each still segment into episodes based on changes in the audio information in each said still segment;
   indexing the video sequence with an identifier that signifies at least one of a start or an end of an episode contained in the video sequence;
   detecting a change in camera motion in the video information;
   marking the location in the video stream where the change in camera motion is detected;
   separating the motion segments into fast motion segments and slow motion segments based on the speed of the camera motion; and
   partitioning each slow motion segment into episodes based on changes in the audio information in each said slow motion segment.

18. The computer readable medium of claim 17, wherein the change in audio information also includes a change in a sound level of the audio information by a predetermined relative level or by a predetermined selected percentage.

19. A method for indexing a video sequence comprised of video information and audio information, wherein the video sequence has been created by at least one camera, comprising:
   separating the video sequence into motion segments that were created while the camera was in motion and into still segments that were created while the camera was in a fixed position;
   partitioning each still segment into episodes based on changes in the audio information in each said still segment;
   indexing the video sequence with an identifier that marks at least one of a start or an end of an episode contained in the video sequence;
   detecting a change in camera motion in the video information;
   marking the location in the video stream where the change in camera motion is detected;
   separating the motion segments into fast motion segments and slow motion segments based on the speed of the camera motion; and
   partitioning each slow motion segment into episodes based on changes in the audio information in each said slow motion segment.

* * * * *

UNITED STATES PATENT AND TRADEMARK OFFICE
CERTIFICATE OF CORRECTION

PATENT NO. : 7,483,624 B2 Page 1 of 1
APPLICATION NO. : 10/231036
DATED : January 27, 2009
INVENTOR(S) : Tong Zhang It is certified that error appears in the above-identified patent and that said Letters Patent is hereby corrected as shown below:

In column 9, line 17, in Claim 14, delete "the, end" and insert -- the end --, therefor.

Signed and Sealed this

Twenty-first Day of April, 2009

JOHN DOLL
*Acting Director of the United States Patent and Trademark Office*